Patented May 31, 1932

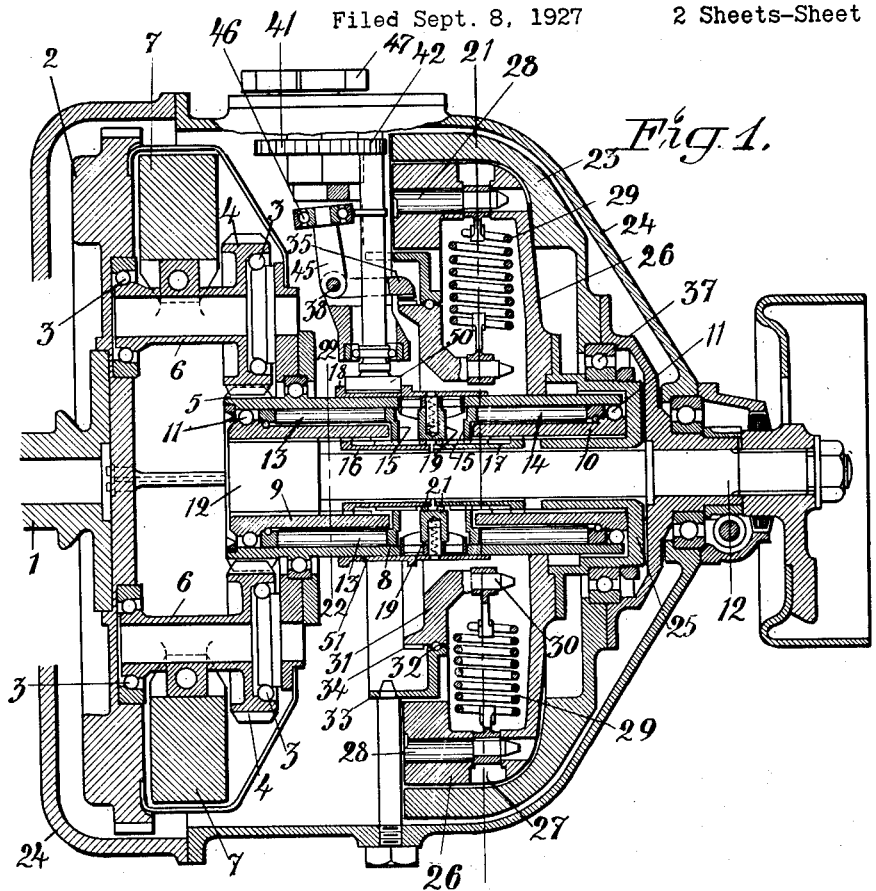

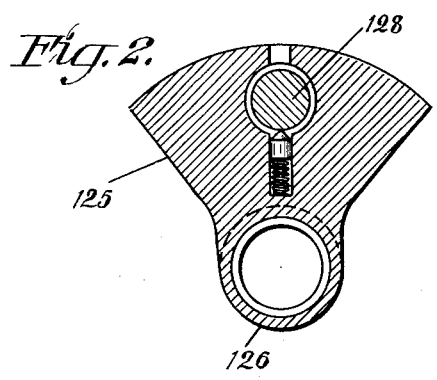
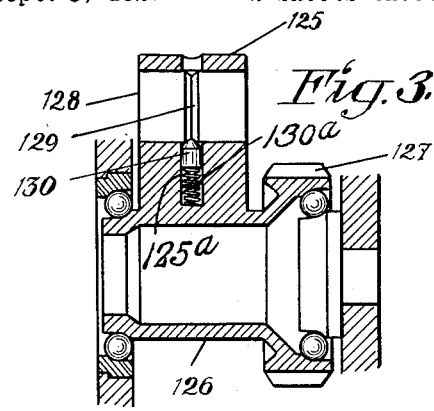
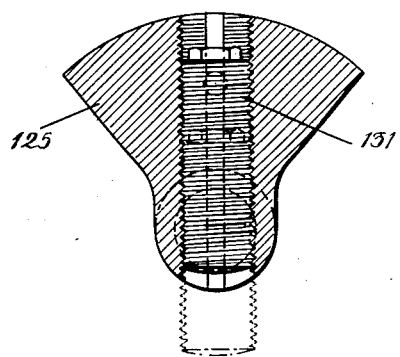
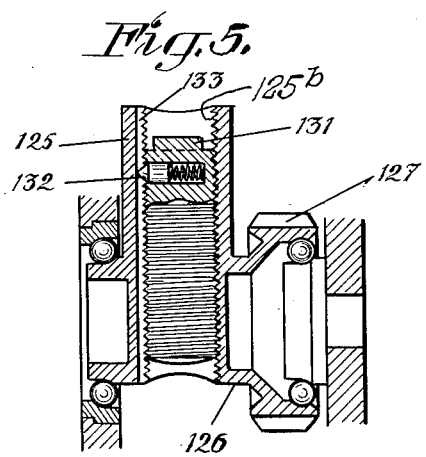
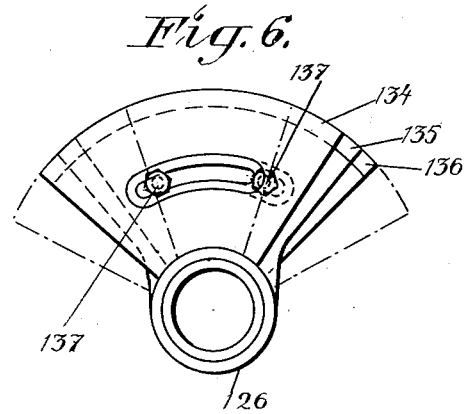
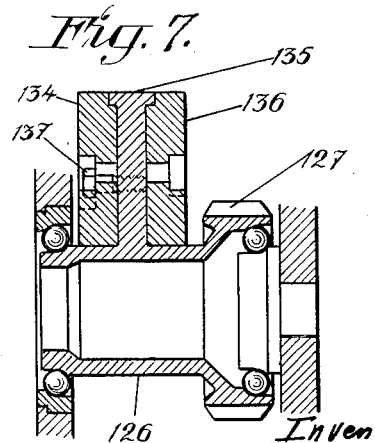

1,861,418

UNITED STATES PATENT OFFICE

FREDRIK LJUNGSTRÖM, OF LIDINGO, SWEDEN, ASSIGNOR, BY MESNE ASSIGNMENTS, TO PED, INCORPORATED, A CORPORATION OF DELAWARE

POWER TRANSMISSION

Application filed September 8, 1927, Serial No. 218,293, and in Sweden February 16, 1927.

The present invention relates to power transmissions. More particularly, it relates to variable speed power transmissions of the type disclosed in United States Patents Nos. 1,810,282 and 1,810,283 granted to me June 16, 1931.

Transmissions of this type provide either synchronous drive between a driving member and a driven member, that is with these two members operating at the same speed, or asynchronous drive between these two members, and further provide, under conditions of asynchronous drive, for automatic variation of the speed ratio between the driving and driven members in accordance with the variations in the relation of the torque developed by the driving member and the torque load on the driven member.

Under conditions of asynchronous drive, the power due to rotary motion of the driving member is converted to turning moments of alternate opposite sense or direction, which turning moments are applied to an intermediate transmission member. The alternate opposite turning moments applied to the intermediate transmission member are selectively transmitted by suitable mechanism to the driven member and to an abutment, the turning moments of one sense being transmitted to the driven member to cause rotation thereof, and the turning moments of opposite sense being directed toward the abutment.

The mechanism for converting the continuous torque of the driving member into alternate opposite turning moments, includes inertia masses or weights which are rotated due to actuation by the driving member and which, due to the centrifugal force generated by their rotation, produce the turning moments applied to the intermediate member.

Under conditions of synchronous drive the centrifugal force generated by the inertia masses operates to cause a continuous turning moment to be applied to the intermediate member of the transmission and this continuous turning moment is transmitted to the driven member to drive the latter at the same speed as the driving member. Under this condition of drive no forces are directed toward the abutment.

The operating characteristics of the transmission, briefly outlined above are explained in detail in the aforementioned patents.

In variable speed transmissions of the type in question, in which inertia masses produce alternate opposite turning moments, the value of the turning moment obtainable is dependent upon the value of the centrifugal forces developed by rotation of the masses. Furthermore, the value of the turning moment is also dependent on the degree of eccentricity of the inertia masses with respect to their axes of rotation.

If such a transmission has once begun to operate synchronously, the operation may be compared with the operation of an electric machine which is operating "in phase". A characteristic of this operation is that a much greater turning moment or greater torque from the source of power is required to bring the transmission out of phase, that is, to cause it to return to asynchronous operation, than is required to bring the transmission into synchronous operation from asynchronous operation. The turning moment or torque delivered by the transmission is in general dependent upon the square of the speed of operation of the inertia masses.

If now an engine driven vehicle provided with such a transmission ascends a hill too steep to be negotiated in direct or synchronous drive and the transmission begins to operate asynchronously, it may readily happen that due to such asynchronous operation, which permits a far higher engine speed than that which corresponds to the speed of the propeller or drive shaft of the vehicle, the vehicle is accelerated to such an increased speed on account of the greater power delivered by the engine operating at high speed, that the centrifugal forces developed by the inertia masses increase to an extent compelling the transmission to phase into synchronous operation. This phasing in of the transmission to synchronous drive will force the engine to turn at a lower speed and consequently deliver less power and if the grade is still too steep to be negotiated in direct drive the speed of the engine will continue to decrease, as will the speed of rotation of the inertia masses. When the speed decreases to a value determined by the characteristic of the masses, the torque or turning moment derived from the engine will overcome the centrifugal forces generated by the masses and tending to maintain the transmission in synchronous operation, and the transmission will again phase out and return to asynchronous operation.

If, now, inertia masses of less magnitude or inertia masses having less eccentricity are used in the same transmission, it is evident that the vehicle will attain a greater speed before the centrifugal forces developed by the inertia masses become sufficiently great to cause the transmission to phase into synchronous operation. In such case it is therefore possible to ascend a given grade more rapidly since at a relatively higher vehicle speed the engine will still be able to operate at high speed due to the fact that it may continue to operate under conditions equivalent to driving "in gear" with the ordinary type of transmission.

It is to be noted, however, that inertia masses which are too light or which have too little eccentricity will at a given speed of operation generate centrifugal forces of such relatively small value that the transmission will operate asynchronously even though road conditions are such that synchronous drive is desirable. For this reason the inertia masses should be proportioned so that normal operation is effected synchronously and asynchronous operation occurs only when it is desired to accelerate the vehicle or to ascend grades too steep to be properly negotiated when in direct or synchronous drive.

For the same reason that a vehicle with relatively light inertia masses will ascend a grade more rapidly than a vehicle having heavier inertia masses which impose synchronous drive at lower speeds, a vehicle with lighter inertia masses will accelerate more rapidly than one with heavier inertia masses. This permits the operating charactertisics of the vehicle to be varied in accordance with the desires of a given driver, for by making the inertia masses relatively light or of small eccentricity a vehicle can be provided having rapid acceleration and the ability to ascend grades at high speed. On the other hand, for a driver who desires to operate a vehicle in direct or synchronous drive for as large a proportion of the time as possible, relatively heavy inertia masses or masses having relatively great eccentricity, will provide this operating characteristic.

A general object of the present invention is to provide a transmission of the character described in which the operating characteristics of the transmission, with respect to the speed of operation at which drive is changed from asynchronous to synchronous and vice versa, may be altered.

This general object of the invention is effected by means whereby the effective value of the centrifugal forces developed by the inertia masses at a given speed of rotation thereof may be varied. More specifically the invention contemplates varying the effective value of the turning moments applied by the inertia masses to the driven parts of the transmission by varying the amount of eccentricity of the centers of gravity of the inertia masses with respect to their axis of rotation or by varying the weight of the inertia masses, whereby the same result may be obtained.

In the accompanying drawings I have illustrated more or less diagrammatically a transmission of the type to which the present invention is applicable and several forms of inertia masses adapted to be applied to such transmission to effect the object of the present invention.

In the drawings:

Fig. 1 is a longitudinal central section through a typical transmission of the character referred to;

Figs. 2 and 3 are views taken at right angles to each other and on an enlarged scale of one form of inertia mass adapted to be applied to the transmission illustrated in Fig. 1;

Figs. 4 and 5 are views similar to Figs. 2 and 3 respectively, illustrating another form of inertia mass; and Figs. 6 and 7 are views similar respectively to Figs. 2 and 3 illustrating still another form of inertia mass.

Referring now to Fig. 1, the driving member is designated at 1. This member may be the crank shaft of an internal combustion engine or any other power shaft. Secured to shaft 1 is a hollow fly-wheel indicated generally at 2 on which a plurality of inertia masses, indicated more or less diagrammatically at 7, are rotatably mounted as by the spaced ball bearings 3, which serve to support the hollow shafts or sleeves 6. As will be seen from the drawing, the masses 7 are eccentrically placed with respect to the axes of rotation of the sleeves 6.

Integral with each of the sleeves 6 is a pinion 4 and the several pinions 4 mesh with a common gear 5, the latter being fixed on a rotatably mounted sleeve 8 forming the intermediate member of the transmission to which alternate turning moments of opposite sense are applied due to the centrifugal forces generated by rotation of the masses 7 about their axes.

In the form of transmission which I have illustrated, the means for selectively transmitting the alternate opposite turning moments to an abutment and to the driven shaft 12 respectively, comprises two overrunning roller clutches arranged to grip and release in opposed relation so that turning moments of one sense or direction are applied to the driven member 12, and turning moments of the opposite sense or direction are directed to the abutment, which in the present instance, is provided by the transmission casing 24. The clutch which acts to transmit turning moments from the intermediate member 8 to the driven member, which clutch will hereinafter be referred to as the action clutch, comprises the left hand end of the intermediate sleeve member 8 and a sleeve 9 annularly spaced within sleeve 8. Between sleeves 8 and 9 are situated a plurality of gripping detents in the form of rollers 13, which rollers are housed in a cage 15. The confronting surfaces of the spaced sleeves 8 and 9 are formed so as to provide axially extending wedge shaped pockets in which the individual rollers 13 are located and depending upon the position of rotation of the cage 15 with respect to the gripping surfaces, the action clutch may be made to transmit turning moments in one direction or the other from the sleeve 8 to the sleeve 9. This type of clutch is fully described in my granted patents above referred to, to which reference may be had for a more detailed disclosure.

The reaction clutch for directing turning moments from the intermediate member or sleeve 8 to the abutment provided by the casing 24, comprises the right hand end of sleeve 8 and a sleeve 10, between which sleeves are situated a plurality of roller detents 14 housed in a second cage 15. The construction of the reaction clutch is similar to the construction of the action clutch.

Sleeves 9 and 10 are rotatably mounted with respect to sleeve 8 as by ball bearings 11 and sleeve 10 is rigidly connected to a reaction inertia mass 26. The reaction mass 26 is in turn connected by means of a series of radially arranged springs to a rotatably mounted annular member 31 supported by ball bearing 32. Member 31 is held against rotation due to the meshing of some of a series of gear teeth 34 thereon with cooperating gear teeth 35 on a releasing member 45 associated with the mechanism for reversing the direction of power transmission through the transmission.

The action and reaction clutches are set so that they grip in opposed relation. For example, the cage 15 holding rollers 13 may be set so that clockwise turning moments (viewed from the left of Fig. 1) are transmitted from sleeve 8 to sleeve 9 and thence to the driven member 12, while counter-clockwise turning moments (viewed in the same direction) are transmitted from sleeve 8 to sleeve 10 and thence to the resiliently mounted reaction inertia mass 26 which, due to its anchorage through springs 29 to the member 31, provides a path of force transmission terminating in the abutment 24. Assuming, as in the case of the ordinary internal combustion engine, that the power shaft 1 rotates in clockwise direction it will be seen that this adjustment of the clutches provides for drive of the driven member 12 in the same direction as the direction of movement of the shaft 1. This can be considered forward drive through the transmission.

The direction of drive through the transmission from the power shaft 1 to the driven member 12 may be reversed by reversing the action and reaction clutches. Reversal of the clutches is effected by moving the rollers 13 and 14 rotationally with respect to their gripping surfaces so that the action clutch transmits counter-clockwise turning moments (viewed from the left of Fig. 1) from sleeve 8 to sleeve 9, and the reaction clutch transmits clockwise turning moments from sleeve 8 to sleeve 10.

Reversal of the clutches is effected by longitudinal movement of shift sleeves 16 and 17 connected to a common shift sleeve 18 located outside the intermediate sleeve 8.

The general arrangement of parts in the transmission which have been briefly described above, and the operation of the transmission with respect to the clutch and reversing mechanisms, form no part of the present invention and are fully disclosed in my granted patents already referred to.

As previously pointed out herein, the value of the turning moments applied to the intermediate transmission member due to rotation of the inertia masses 7 has a marked effect upon the operating characteristics of the transmission and in order to effect the objects of the present invention, I provide inertia masses of novel form which are capable, under different conditions of adjustment, of producing, at a given speed of rotation, turning moments of different value.

One form of inertia mass for carrying the invention into effect is illustrated in Figs. 2 and 3. In this form the inertia mass comprises a main weight 125 secured to the hollow shaft 126 corresponding to the shaft 6 illustrated in Fig. 1. Shaft 126 has formed thereon the gear 127 corresponding to the gear 4 shown in Fig. 1. The main weight 125 is bored parallel to the axis of shaft 126 and is adapted to receive a secondary weight 128 in the form of a cylinder having a circumferential groove 129 therein. Groove 129 is adapted to cooperate with the resilient locking device comprising the conically headed pin 130 which is forced into engagement with the groove 129 by means of a spring 130a located in the recess 125a in the main weight. In this form of apparatus the variation in the value of the turning moment produced by the inertia mass at a given speed is varied by removing or inserting the secondary weight 128 which, as will be evident from the drawings, is readily displaceable with respect to the main weight because of the resilient character of the means for locking it in position.

Figs. 4 and 5 illustrate another form of inertia mass in which the secondary weight 131 is adapted to be screwed inwardly or outwardly in the radially extending threaded bore 125b. Weight 131 may be locked in desired position with respect to weight 125 by means of a locking pin 132 resiliently mounted in weight 131 and adapted to engage groove 133 in the threaded bore 125b.

In the form shown in Figs. 2 and 3, the desired object is attained primarily through altering the weight of the inertia mass, whereas in the present form the same object is attained, not by altering the weight of the inertia mass, but by altering the position of the center of gravity of the mass with respect to the center of rotation of the shaft 126.

In Figs. 6 and 7 still another form of apparatus is illustrated. In this form the inertia mass comprises a plurality of segments, the central segment 135 of which, is fixed with respect to shaft 126. Adjustable segments 134 and 136 are secured to the opposite sides of segment 135 as by studs 137 which pass through arcuate grooves in the outer segments. As will be readily apparent from the drawings, the segments 134 and 136 may be adjusted rotationally with respect to the center segments 135 and by such adjustment the distance from the center of rotation of shaft 126 to the center of gravity of the entire inertia mass formed by the three segments can be varied.

From the above it will be evident that the desired object of the invention, that is, variation of the so-called phase-in characteristic of the transmission from asynchronous to synchronous drive, can be effected by a number of different forms of construction and the invention is therefore not to be understood as limited to those forms illustrated herein by way of example but is to be understood as embracing all such changes and modifications as may fall within the scope of the appended claims.

What I claim is:—

1. A variable-speed power transmission of the type automatically providing synchronous-asynchronous drive through the transmission comprising a driving member, mechanism actuated by the driving member for producing alternate opposite turning moments to effect asynchronous drive and a continuous turning moment to effect synchronous drive, said mechanism including a rotatably mounted intermediate member and an inertia mass rotatably mounted eccentrically with respect to the axis of rotation of the intermediate member, said mass operating to generate centrifugal force upon rotation by the driving member and to apply a turning moment to the intermediate member due to said force, and means for varying the effective value of the turning moment applied to the intermediate member at a given speed of rotation of said mass.

2. A variable-speed power transmission of the type automatically providing synchronous-asynchronous drive through the transmission comprising a driving member and mechanism actuated by the driving member for producing alternate opposite turning moments to effect asynchronous drive and a continuous turning moment to effect synchronous drive, said mechanism comprising an inertia mass rotatably mounted to generate centrifugal force upon actuation by the driving member, the value of said turning moments varying with variations in the value of said force, and means for altering the value of the centrifugal force generated at a given speed of rotation of said mass.

3. A variable-speed power transmission of the type automatically providing synchronous-asynchronous drive through the transmission comprising a driving member and mechanism actuated by the driving member for producing alternate opposite turning moments to effect asynchronous drive and a continuous turning moment to effect synchronous drive, said mechanism comprising an inertia mass rotatably mounted to generate centrifugal force upon actuation by the driving member, the value of said turning moments varying with variations in the value of said force, and said mass comprising means for altering the value of the centrifugal force generated at a given speed of rotation of said mass.

4. A variable-speed power transmission comprising a driving member, a driven member, an abutment, force producing mechanism including an inertia mass actuated by the driving member for alternately producing opposite turning moments, said mechanism being alterable to vary the effective force produced by said mass at a given speed of the driving member, and mechanism for transmitting the produced opposite turning moments to the driven member and to the abutment respectively.

5. A variable-speed power transmission comprising a driving member, a driven member, an abutment, mechanism actuated by the driving member for alternately producing opposite turning moments, said mechanism including rotatably mounted inertia masses actuated by the driving member, said masses being alterable to vary the distances of their centers of gravity from their centers of rotation, and mechanism for transmitting the produced opposite turning moments to the driven member and to the abutment respectively.

6. A variable-speed power transmission comprising a driving member, a driven member, an abutment, mechanism actuated by the driving member for alternately producing opposite turning moments, said mechanism including rotatably mounted inertia masses actuated by the driving member, each of said masses comprising relatively movable parts alterable with respect to each other to vary the distance of the center of gravity of the mass from its center of rotation, and mechanism for transmitting the produced opposite turning moments to the driven member and to the abutment respectively.

7. A variable-speed power transmission comprising a driving member, a driven member, an abutment, mechanism actuated by the driving member for alternately producing opposite turning moments, said mechanism including rotatably mounted inertia masses actuated by the driving member, each of said masses comprising a detachably secured part removable to alter the weight of the mass, and mechanism for transmitting the produced opposite turning moments to the driven member and to the abutment respectively.

8. A variable-speed power transmission comprising a driving member, a driven member, an abutment, mechanism actuated by the driving member for alternately producing opposite turning moments, said mechanism including a rotatably mounted inertia mass actuated by the driving member, said mass comprising a main weight radially fixed with respect to the center of rotation of the mass and a secondary weight adjustable with respect to the main weight to alter the distance from said center of rotation to the center of gravity of the mass, and mechanism for transmitting the produced opposite turning moments to the driven member and to the abutment respectively.

9. A variable-speed power transmission comprising a driving member, a driven member, an abutment, mechanism actuated by the driving member for alternately producing opposite turning moments, said mechanism including a rotatably mounted inertia mass actuated by the driving member, said mass comprising a main weight radially fixed with respect to the center of rotation of the mass and having a radially extending bore therein, and a secondary weight threaded in said bore, whereby to permit alteration of the position of said secondary weight radially with respect to the center of rotation of the mass, and mechanism for transmitting the produced opposite turning moments to the driven member and to the abutment respectively.

10. A variable-speed power transmission comprising a driving member, a driven member, an abutment, mechanism actuated by the driving member for alternately producing opposite turning moments, said mechanism including a rotatably mounted inertia mass actuated by the driving member, said mass comprising a plurality of segmental plates radially fixed with respect to the center of rotation of the mass and rotationally adjustable with respect to each other to alter the position of the center of gravity of the mass radially with respect to the center of rotation, and mechanism for transmitting the produced opposite turning moments to the driven member and to the abutment respectively.

In testimony whereof I affix my signature.
FREDRIK LJUNGSTRÖM.